(12) United States Patent
Provencher (10) Patent No.: US 10,248,880 B1
(45) Date of Patent: Apr. 2, 2019

(54) METHOD OF PROCESSING AND RECOGNIZING HAND-WRITTEN CHARACTERS

(71) Applicant: Samuel David Provencher, Waltham, MA (US)

(72) Inventor: Samuel David Provencher, Waltham, MA (US)

(73) Assignee: Boston Inventions, LLC, Waltham, MA (US)

( * ) Notice: Subject to any disclaimer, the term of this patent is extended or adjusted under 35 U.S.C. 154(b) by 38 days.

(21) Appl. No.: 15/615,215

(22) Filed: Jun. 6, 2017

Related U.S. Application Data (60) Provisional application No. 62/345,928, filed on Jun. 6, 2016.

(51) Int. Cl.
  *G06K 9/34* (2006.01)
  *G06K 9/00* (2006.01)

(52) U.S. Cl.
  CPC ......... *G06K 9/344* (2013.01); *G06K 9/00416* (2013.01); *G06K 9/00422* (2013.01)

(58) Field of Classification Search
  None
  See application file for complete search history.

(56) References Cited

U.S. PATENT DOCUMENTS

| | | | | |
|---|---|---|---|---|
| 5,479,596 A | * | 12/1995 | Capps | G06F 17/25 345/156 |
| 5,613,019 A | * | 3/1997 | Altman | G06F 3/04883 382/189 |
| 5,862,256 A | * | 1/1999 | Zetts | G06F 3/04883 382/187 |
| 7,489,819 B2 | * | 2/2009 | Sheets | G06K 9/00436 382/186 |
| 9,430,704 B2 | * | 8/2016 | Abdollahian | G06T 3/60 |
| 9,740,925 B2 | * | 8/2017 | Haji | G06K 9/00879 |
| 9,886,629 B2 | * | 2/2018 | Jain | G06K 9/00456 |

(Continued)

OTHER PUBLICATIONS

Bharathi, J., and P. Chandrasekar Reddy. "Segmentation of Telugu Touching Conjunct Consonants Using Overlapping Bounding Boxes." International Journal on Computer Science and Engineering 5, No. 6 (2013): 538. (Year: 2013).*

*Primary Examiner* — Michelle M Entezari (74) *Attorney, Agent, or Firm* — Ascentage Patent Law, LLC; Travis Lee Johnson; David S. Einfeldt (57) ABSTRACT

The present disclosure relates to a method and system of processing original handwriting input, the system and method being capable of recognize a plurality of strokes provided on the input recognition interface, the method including: determining a stroke box around each stroke; determining overlap between the stroke boxes; correlating overlapping stroke boxes to one or more characters; providing a character box around each of the one or more characters; determining overlap between character boxes; correlating overlapping character boxes to one or more words; providing a word box around each of the one or more words; provide a word margin around each of the one or more word boxes; determining overlap between each word box to determine a line; wherein each of the characters, words, or lines can be individually selected and rearranged, the system automatically adjusting spacing or placement of surrounding elements to allow for the rearrangement.

1 Claim, 10 Drawing Sheets

(56) References Cited

U.S. PATENT DOCUMENTS

| | | | | |
|---|---|---|---|---|
| 10,163,004 | B2* | 12/2018 | Guarnieri | G06K 9/00416 |
| 2003/0086611 | A1* | 5/2003 | Loudon | G06K 9/342 |
| | | | | 382/186 |
| 2005/0035193 | A1* | 2/2005 | Gustin | G06Q 20/10 |
| | | | | 235/379 |
| 2013/0238966 | A1* | 9/2013 | Barrus | G06K 9/00449 |
| | | | | 715/223 |
| 2015/0169975 | A1* | 6/2015 | Kienzle | G06K 9/34 |
| | | | | 382/189 |
| 2015/0294476 | A1* | 10/2015 | Tang | G06T 7/248 |
| | | | | 382/173 |
| 2015/0363035 | A1* | 12/2015 | Hinckley | G06F 3/0383 |
| | | | | 345/173 |
| 2016/0147437 | A1* | 5/2016 | Tsutsui | G06K 9/00436 |
| | | | | 715/268 |
| 2016/0259766 | A1* | 9/2016 | Ivanov | G06F 17/241 |

\* cited by examiner

METHOD OF PROCESSING AND RECOGNIZING HAND-WRITTEN CHARACTERS

PRIORITY

This application claims priority to U.S. provisional application No. 62/345,928, which was filed on Jun. 6, 2016, and is hereby incorporated by reference in its entirety.

COPYRIGHT STATEMENT

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND OF THE INVENTION

1. Field of the Invention

The disclosure relates to word processing, particularly in regard to recognition of handwritten notes in electronic media through the gesture tracking and analysis of handwritten characters or strokes provided by a finger or stylus.

2. Description of the Prior Art

Present electronic writing systems typically seek to translate or otherwise convert optically recognized characters or strokes of a finger or stylus into an electronic font format, for example Arial, Calibri, or Times New Roman. In additional systems, pre-programmed stroke sequences are configured to correspond to particular letters of the alphabet. The pioneers of such systems including the Palm™ series personal organizers. However, the personal touch is somewhat lost because these systems almost always remove the handwritten strokes and replace them with font type characters. One of the goals of the present disclosure is to provide a system which retains the actual strokes and recognizes the hand-written words while allowing a certain degree of manipulation yet retaining the images of the original input strokes and thus the look of natural handwriting.

SUMMARY

Contemplated herein is a handwriting recognition and processing system which can include a non-transitory computer-readable medium; an input recognition interface; and processing circuitry operably connected to the non-transitory computer-readable medium and the input recognition interface. In various embodiments as contemplated herein the processing circuitry being configured to perform the following tasks: recognize a plurality of strokes provided on the input recognition interface; determine a stroke box around each stroke; provide a stroke margin around each of the stroke boxes; determine overlap between the stroke margins for each stroke box; correlate overlapping stroke margins to one or more characters; provide a character box around each of the one or more characters; and provide a character margin around each of the one or more character boxes.

In yet additional embodiments, the processing circuitry can be configured to determine overlap between the character margins for each character box; and correlate overlapping character margins to one or more words.

In yet additional embodiments, the processing circuitry can also be configured to differentiate between a plurality of input methods including at least a stylus input and a touch input. In some such embodiments, input from the stylus can be associated with a positive stroke, and touch input can be alternatively associated with an alternative command. In such a case, at least one alternative command can be associated to an undo command regarding at least one previous stroke.

In yet additional embodiments, the input recognition interface can be configured to receive a positive inference stroke connecting a plurality of separated strokes from the stylus, and a touch input received to delete the positive inference stroke, wherein the processing circuitry can then retain inference information between the strokes so as to recognize the plurality of separated strokes as an associated character, word, or line.

In addition to strokes and stroke boxes, additional classes of character groups can be created, for example for words and lines. In some such instances, the processing circuitry can then be configured to provide a word box around each of the one or more words; provide a word margin around each of the one or more word boxes; determine overlap between the word margins for each word box; correlate overlapping word margins to one or more lines; and determine a line box correlating to the vertical and horizontal bounds of each line.

Additionally, in some embodiments where the processing circuitry recognizes a distinct line of characters or words, the processing circuitry can then determine a reference line or central line for each line box; and determine an offset of each word with respect to the reference or central line.

In yet additional embodiments the processing circuitry can be further configured to perform the following tasks: calculating an average word spacing; allow selection of an individual word; and allow for repositioning of the individual word within an associated reference or central line; wherein one or more surrounding words are configured to be automatically repositioned along the reference or central line to allow for repositioning of the individual word in accordance with the average word spacing on the reference or central line having a proper associated offset with respect to the reference or central line.

Similarly, the processing circuitry can be further configured to perform the following tasks: calculate an average character spacing; determine an offset of each character with respect to an associated reference or central line; allow selection of an individual character within an associated word; and allow for repositioning of the individual character within the associated word along the associated reference or central line; and wherein one or more surrounding characters are configured to be automatically repositioned along the reference or central line to allow for repositioning of the individual character in accordance with the average character spacing on the associated reference or central line having a proper associated offset with respect to the reference or central line.

In yet further embodiments, the processing circuitry can be further configured to perform the following tasks: calculate an average word spacing; calculate an average character spacing; receiving user input regarding selection of an individual word or character; and receive a user input correlating to a deletion command of the word or character within an associated word or line; wherein one or more surrounding words or characters are repositioned along the reference or central line to allow for repositioning of the individual word or character in accordance with the average word or character spacing.

Also contemplated herein is a method of recognizing and processing hand-written strokes and characters, the method including the steps of: receiving a plurality of strokes provided by using a writing utensil on an input recognition interface; recognizing the plurality of strokes provided on the input recognition interface utilizing processing circuitry; determining a stroke box around each stroke; providing a stroke margin around each of the stroke boxes; determining an overlap between the stroke margins for each stroke box; correlating any overlapping stroke margins to one or more characters; providing a character box around each of the one or more characters; providing a character margin around each of the one or more character boxes; determining overlap between the character margins for each character box; correlating overlapping character margins to one or more words; and storing stroke and character information on a non-transitory computer-readable medium.

The method can also include a step of: differentiating between a plurality of input methods including at least a tactile touch input and input received by the writing utensil, wherein input from the writing utensil is associated with a positive stroke, and touch input is associated with an alternative command.

In some additional embodiments, the method can include situations in which at least one alternative command is an undo command regarding at least one previous stroke.

The method can also include the steps of: receiving, from the writing utensil, a positive inference stroke connecting a plurality of separated strokes; and receiving a touch input so as to delete the positive inference stroke, wherein the processing circuitry causes the non-transitory computer-readable media to retain inference information between the strokes so as to recognize the plurality of separated strokes as an associated character, word, or line.

The method can also include the steps of: providing a word box around each of the one or more words; providing a word margin around each of the one or more word boxes; determining an overlap between the word margins for each word box; correlating overlapping word margins to one or more lines; determining a line box correlating to the vertical and horizontal bounds of each line; determining a reference or central line for each line box; and determining an offset of each word with respect to the reference or central line.

Similarly, the method can also include the steps of: calculating an average word spacing; selecting an individual word; and repositioning the individual word within an associated reference or central line; wherein one or more surrounding words are configured to be automatically repositioned along the reference or central line to allow for repositioning of the individual word in accordance with the average word spacing on the reference or central line having a proper associated offset with respect to the reference or central line.

Similarly, the method can also include the steps of: calculating an average character spacing; determine an offset of each character with respect to an associated reference or central line; selecting an individual character within an associated word; and repositioning the individual character within the associated word along the associated reference or central line; and wherein one or more surrounding characters are configured to be automatically repositioned along the reference or central line to allow for repositioning of the individual character in accordance with the average character spacing on the associated reference or central line having a proper associated offset with respect to the reference or central line.

Similarly, the method can also include the steps of: calculating an average word spacing; calculating an average character spacing; receiving user input regarding selection of an individual word or character; and receiving a user input correlating to a deletion command of the word or character within an associated word or line; wherein one or more surrounding words or characters are repositioned along the reference or central line to allow for repositioning of the individual word or character in accordance with the average word or character spacing.

DETAILED DESCRIPTION

This disclosure relates generally to a system and associated methods which are designed to combine some of the benefits of word processing with the benefits and personalization and stylization of manually inputted strokes, i.e. handwriting. As such, methods and systems of the present invention will outline a conceptual model and methodology for combining various core workflows of word processing as we know it with the much simpler and user-friendly formats of handwritten documents in a new way that works for a wide range of documents, including short notes, letters, as well as more formal and possibly lengthy compositions but is capable of being utilized across numerous writing styles, languages and character formats.

It will be appreciated that the methods will be discussed as related to known consumer electronics which include processing circuitry, non-transitory computer-readable media, and user interfaces, for example present tablets or other consumer electronics which can utilize touch screen or stylus type inputs, alternative uses and platforms capable of performing the methods discussed herein will be appreciated by those having skill in the art, such as for three-dimensional design, or in virtual reality workspaces. As such, it will be further appreciated that the methods can also be applied to any number of devices that presently exist and others that will be developed at a later time.

It will be further appreciated that while the present disclosure refers generally to the use of a stylus, virtually all writing implements will be recognized as a suitable stroke input method, including fingers, hand gestures, etc. Additionally, strokes can be recorded in real time, or scanned upon conclusion of a particular input, such as after the completion of a sentence. Further, the writing surface can include a screen, paper, board, either tangible or virtual, or virtually any number of surfaces configured to recognize user inputs and, in some instances, distinguish between various input means particularly utilizing gestures as input.

The methods of the present invention will involve in-depth discussion of various approaches for breaking down letters, words, and sentences as they occur in written formats. This is accomplished by treating the strokes and characters as simple graphic elements and applying general organizational formatting rules. This generalization serves to strip away various complications and inferences that might seem tied to one style of handwriting and makes the solution broadly applicable to general writing workflows where alternative conventions dominate. Examples of such include right to left rules or top to bottom rules of writing, but such rules can be modified or deleted so as to allow for recognition of characters which occur in various alternative character languages, for example oriental characters, where different rules might apply. As such, it will be appreciated by those having skill in the art, who also are in possession of this disclosure, that treating letters as graphic elements makes it possible to accommodate languages that use non-western alphabets like Chinese, Kanji or Cyrillic. Therefore, while the use of the words "letter" or "character" are used throughout this disclosure, it will be appreciated that any reference to letters of an alphabet are discussing concepts which are equally applicable in many non-western alphabets, are made up of letters that are more symbolic and constitute characters or glyphs rather than letters per se.

Figure 1:
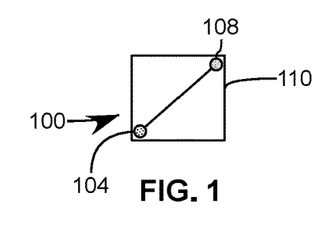
FIG. 1 illustrates a single stroke as received by a user input interface.

One underlying concept in handwriting recognition is that each and every stroke 100 of the stylus 50, or other suitable writing utensil, has a path and each path will have a stroke box 110 which is simply a bounding box that describes the horizontal and vertical extents of the stroke 100. An exemplary stroke box 110 is illustrated in FIG. 1. It will be appreciated that while the various paths which ultimately result in various strokes can be confusing to automatically separate and recognized, however, it is readily understood that individual strokes can be captured as images or a series of grouped data points rather than recognized as alphanumeric characters as they are created, which allows them to be captured and processed independently.

It will then be appreciated that various image capturing processes can be implemented, for example a real-time pointer tracking of a contact point or a visual capture between pointer detection and termination of detection wherein movement therebetween is tracked and captured.

It will then be appreciated that as stroke data is captured and stored, the path can be simultaneously displayed on a user interface of the user interface 14, which can be provided in the form of a touch screen and/or display, wherein the user interface is configured so as to essentially play back the gestures that were captured onto a display surface.

It will then be appreciated that the creation of letters or characters can often require multiple paths/strokes to complete, in which the stylus 50 can be either in constant contact with the surface, or have various breaks in contact throughout creation. Additionally, as particular gestures can be tracked as strokes, which are a grouping of distinct but associated data points, the gestures can signal beginnings and endings of strokes in virtual or three-dimensional formats wherein no surface contact is required or even necessary.

Figure 2A:
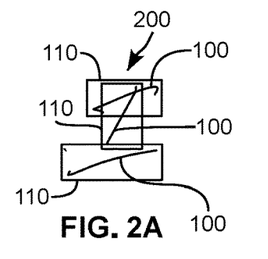
FIGS. 2A-B illustrate screenshot views of various strokes and overlapping stroke boxes as received by the user input interface.
Figure 2B:
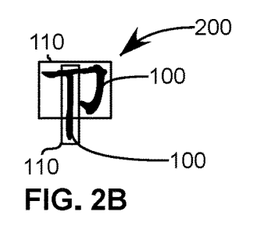

As illustrated in FIGS. 2A and 2B we can observe that even when a character 200 requires numerous strokes 100, each of these strokes will include a stroke box 110 which can contain a beginning point 104 and an end point 108. Additionally, these stroke boxes will most often overlap, thus signifying that while there is a break which creates a "new" stroke, it is nevertheless related to one or more previous strokes, and as such can be correlated together to form a character.

Figure 3A:
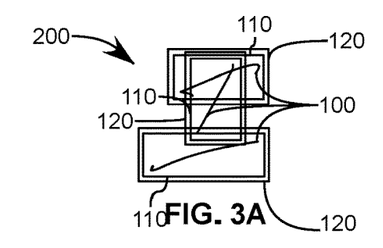
FIGS. 3A-B illustrates screenshot views of various strokes having both stroke boxes and stroke margin boxes around each stroke.

In order to enhance, and adjust, recognition of when multiple paths create a single character 200, a stroke margin 120, as illustrated in FIG. 3A, can be provided about the exterior of the stroke box 110 for each stroke 100. This stroke margin 120 will thus effectively allow for a customizable enlargement of the stroke box so as to allow for enhancement and ultimately increase accuracy of character detection or at least stroke correlations. It will then be understood that the widths and the heights of the stroke margin 120 can be customized in relation to an associated stroke box 110, for example a wider margin in a horizontal direction, but less margin in the vertical direction.

Figure 3B:
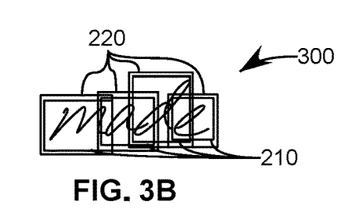

Once a character 200 is created, the character can then be provided with a character box 210, as illustrated in FIG. 3B, which reflects the horizontal and vertical bounds of the strokes forming that character 200. In a method similar to that associated with the strokes above, a character margin 220 can be generated about the character box 210. Which can also be similarly customizable as the stroke margins above, so as to customize when or how character margins of adjacent letters overlap, wherein the characters having overlapping character margins can be associated into words.

Additional information regarding the strokes, such as the thickness, the speed, the direction, the time and so forth can also be captured in meta-data. This information can be used to track strokes even when they overlap each other.

Figure 4:
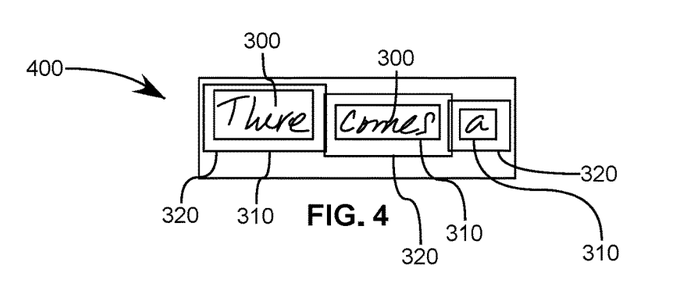
FIG. 4 illustrates a screenshot view of various collections of characters being grouped into words, the words having word boxes and word margin boxes surrounding each word.

Once strokes and characters, with their associated margin boxes are grouped and segregated and stored on a non-transitory computer-readable medium, the various words, can then be grouped or segregated into lines 400, as illustrated in FIG. 4. In order to achieve this correlation, similar to characters and strokes as discussed above, each word 300 can be provided with an associated word box 310 and a word margin 320, wherein the adjacent word margins or sentences overlap, are correlated with one another, and defined or associated with a line 400.

It will also be understood that the stroke, character, or word margins can be proportional to the overall size of the strokes making up an associated particular stroke box, character box, or word box. As a proportional value, it allows for a natural adaptation for the size of strokes, characters, or words, based on the effective font size which is being used and automatically adjusts for the natural increase in spacing used when writing using larger strokes, characters, and words.

Figure 5A:
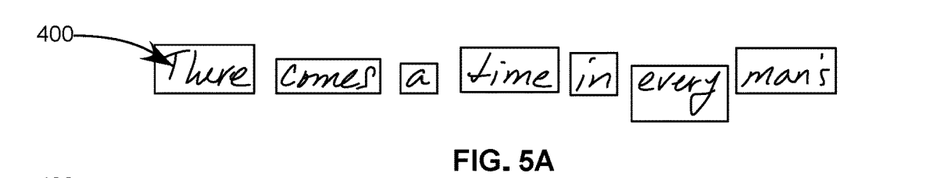
FIGS. 5A-B illustrate screenshot views of various collections of words being grouped as a line.
Figure 5B:
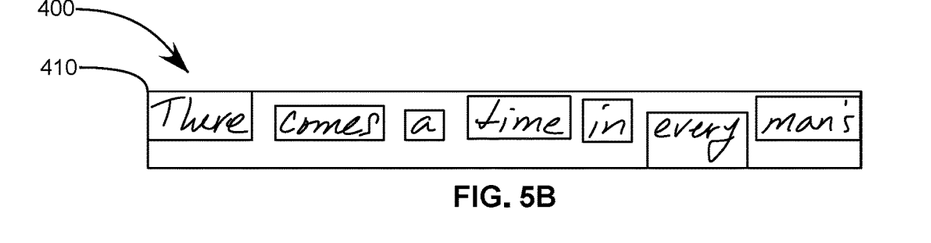

It will be understood that one near-universal feature that is common to nearly all handwriting is that people write a series of words or symbols on a baseline. This base line is usually only implied but some writing paper has printed lines for this purpose. In the method and system of the present invention the system 10 can allow for visual graphic personalization and/or embellishment of choosing different visual treatments in the application. In various cases, particularly where the line is not pre-specified on the writing surface, the system can detect an implied line by examining all the bounding boxes of all the words as illustrated in FIGS. 4 and 5A-B. By examining all of the word margin boxes, the system can derive or otherwise determine a line box 410 that fully encompasses each of the associated word boxes in the same way, by expressing the extents of all the word boxes in an enclosing box. This principle is illustrated by FIGS. 5A-B. This line box 510 can often contain an entire sentence, but may just be one line of a multi-line sentence.

In some embodiments, the line box can be provided with a line margin, which can then be used to group multiple lines together, which could be beneficial for forming paragraphs or when writing in multiple columns. As such, while not explicitly illustrated, these margins can also be added so as to recognize multiple lines in a paragraph, so as to form a paragraph box, so as to scale for larger documents, and the process can be further repeated so as to implement page boxes and chapters, etc., until the entire document is complete.

In the present embodiment, a line box 410 has been created which encompasses an entire line 400 of writing. While it is true that the boxes and the words will often not line up perfectly, a benefit of this natural misalignment provides a look and feel of natural handwriting which can be measured and detected so as to provide the ability to edit, while maintaining a natural look. Presently, there is a near universal assumption that misalignment is undesirable and needs to be corrected, however, it will be understood that the present invention is intended to capture natural handwriting and instead it is the imperfections that make writing distinctive personal, and unique, which characteristics are intended to be retained by the systems and methods discussed herein.

Figure 6:
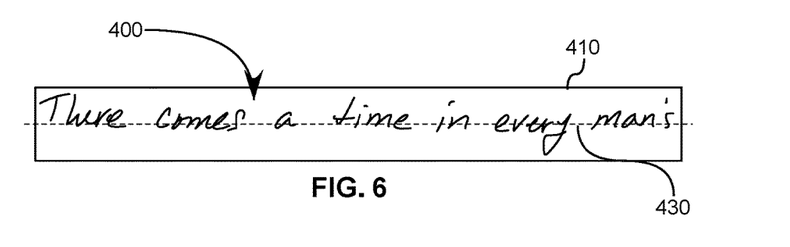
FIG. 6 illustrates a screenshot view of a line box and a calculated reference or central line through the line box.
Figure 7A:
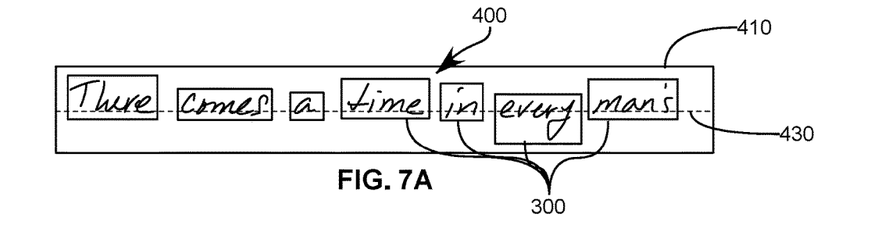
FIGS. 7A-B illustrate a line box and reference or central line, wherein each word has a calculated offset from the reference or central line.
Figure 7B:
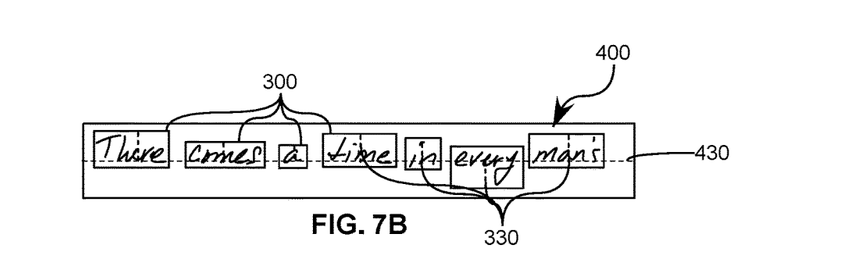

It will then be appreciated that once the line box 410 has been created that each of the word 300 will have a "relative" position within that line as calculated with respect to a reference or central line 430 passing therethrough, as illustrated in FIG. 6. Based on the reference or central line 430, an offset 330 can be determined for each word 300, as illustrated in FIGS. 7A-B. It will be appreciated that this reference or central line 430 is free to constantly change since it is derived from the line box 410, which gets its dimensions from the extents of the word boxes 410 contained thereby. The word offsets 330 can be represented by corresponding distances, which can be expressed as numbers, or by proportions. Additionally, each and every word's relative offset can be based on a distance from each individual word's associated reference or central line to the reference or central line of the line of which if forms part. Alternatively, any particular offset can be determined by alternative metrics, such as a distance from a reference or central line to the bottom or top of each word, an average of individual characters thereof, etc.

It will also be understood that along with an offset from a reference or central line, that an actual or average word spacing can be determined for words on a line, or with respect to adjacent words. This spacing can then be utilized for word selection and repositioning, or editing, as will be discussed in greater detail below. It will then be appreciated that upon insertion, too many words or characters might then exist on a line, in which case words or characters at the beginning or end of a particular line can be automatically migrated onto previous or subsequent lines in accordance with the determined spacings for their new associated lines.

It will be further appreciated that a similar concept can be employed for individual characters within a word, wherein a particular word includes a reference or central line, and a character offset is determined for each character within the word. Similarly, average character spacing within a word can be determined, or a particular character spacing with respect to adjacent characters can be determined, which can also be useful for editing or other manipulation, as will be discussed in more detail below.

It will be appreciated that while a user will normally write as if a writing utensil such as a stylus, finger, or other input mechanism were a pencil or otherwise use the input as a typical writing utensil, or and the user interface were a piece of paper, and that in order to delete text the only change a simple capture program need do is to undo the writing of a word or two. However, once a large amount of writing has been captured, the system needs a bit more than a simple undo or workflow function to adequately edit text. In this manner, the system of the present invention utilizes various function controls. All other document operations can be performed in an edit mode. This, edit mode is designed to allow a user to edit or manipulate various aspects of the strokes, characters, words, or lines.

In some instances, certain stroke patterns or motions can act as shortcuts for various editing techniques, for example one such shortcut motion can include drawing a particular gesture through a word or two so as to delete them, such that the edit mode need not be entered to perform simple tasks. Such an example might include a backward drawn or vertically drawn line through the word. In some such instances, a cursor can be configured to move to the point of deletion, or alternatively a mere highlighting of the word can be presented to the user, such that the word can simply be re-written, wherein the words previously written after the deleted word can be configured to auto-space so as to allow for the new word to be inserted before them.

In some instances, the user interface can be configured to detect differences between various input means, such as between a stylus input, which can be configured as a positive input means, versus a finger or touch input which can be configured as a negative input means, i.e. a deletion. For example, a person can be positively writing with the stylus and the associated strokes showing on the screen with each stroke, character, word, and line associations, but a swipe of the finger can be utilized for an alternative command, such as to undo an immediately previous stroke. Alternatively, a touch input can be utilized as a digital eraser which can be utilized anywhere on the user interface to delete strokes, characters, words, lines, etc. which were previously provided.

By default, the system can automatically enter the edit word mode, but the system can also be configured to toggle between edit word and edit line modes or toggle between selection modes wherein individual strokes, characters, words, or lines can be selected based on varying categories of correlation. It will be readily apparent when the system is in edit mode as the words the user wrote will have visible word or margin boxes and can allow for making selections for editing, manipulating, repositioning, rotating, or deleting those selections. The mechanics of selection chains will be covered in more detail below.

Edit line mode can allow you to make global adjustments to a handwritten line of text wherein the user can adjust the line in various directions. In particular, in edit line mode the number of words or characters which can be selected can include the entire line, or a selection multiple words or characters within that line.

When writing, occasionally there will be the need to undo some gestures; with pencil and paper, trying to erase individual strokes ends up with a poor result most of the time, therefore unlike using a typewriter, the smallest element you can reasonably undo is a word. While there is a granularity of undo which is proper since rewriting the word is the most intuitive place to start; however, not only does it take a lot of time, relatively speaking, but it breaks the cognitive model of writing, causing the writer/user to break or change their line of thought.

Figure 8:
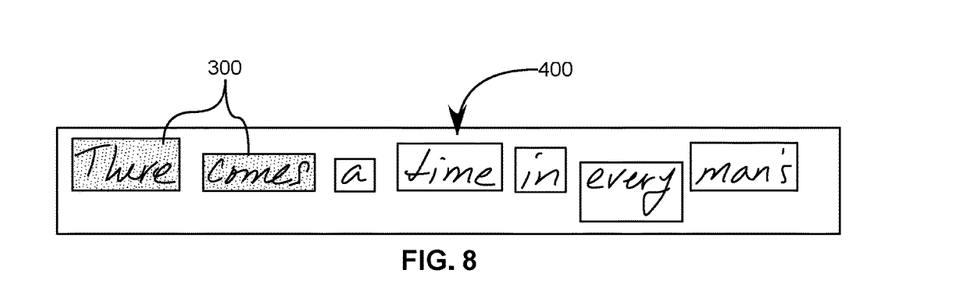
FIG. 8 illustrates a screenshot view of a line having a collection of words having various user selection and highlighting options.

When a user has one or more words that are embedded in the document such that "Undo" is the wrong solution, changing into edit mode can afford additional options for word deletion, manipulation, or editing. In some instances, tapping inside a word box can toggle selection, but starting a stroke outside of a word box will enable a selection stroke where continuing the stroke into a word box, will select that word; this stays in effect until the stroke ends by lifting the stylus. This way, it becomes possible to chain selections of multiple words by continuing the stroke past the first word box into multiple word boxes, effectively selecting all the words. This is similar to simply striking through one or more boxes. Once there are selected words, they can be highlighted as illustrated in FIG. 8, in order to show that they are selected. The selected words can be deleted with a single gesture, such as via a wastebasket icon button, or a particular gesture or stroke while in the edit mode.

Figure 9A:
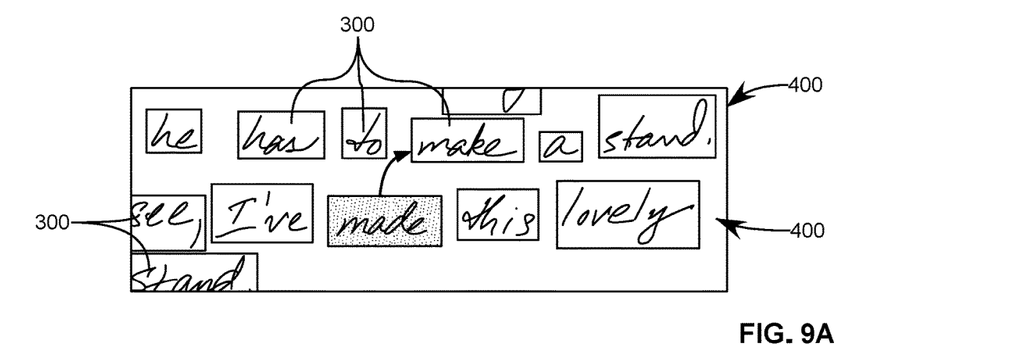
FIGS. 9A-B illustrate screenshot views of a user selection of a word or character and a relocation option available to the user.
Figure 9B:
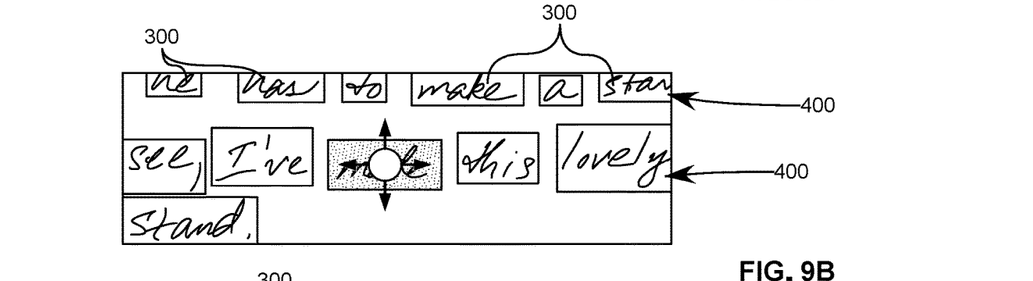
Figure 10A:
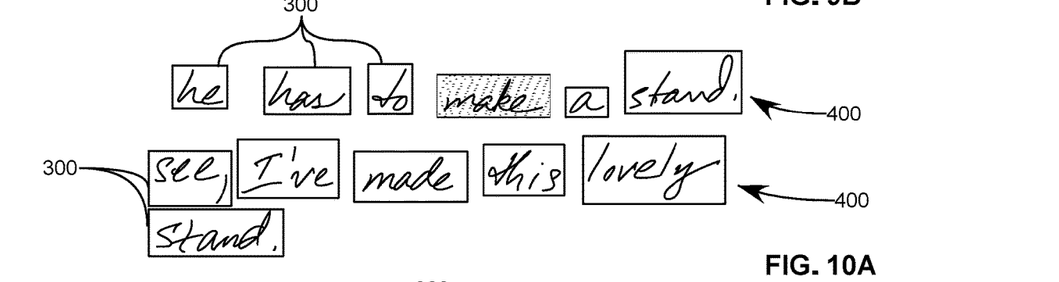
FIGS. 10A-J illustrate screenshot views of a selected word, and a movement transition illustrating an automatic re-spacing of surrounding words on the line into which the word is being placed as well as re-spacing of surrounding words from the line from which the word is being displaced thus illustrating both a respacing during a word addition to a line, as well as an associated respacing during a word deletion.
Figure 10B:
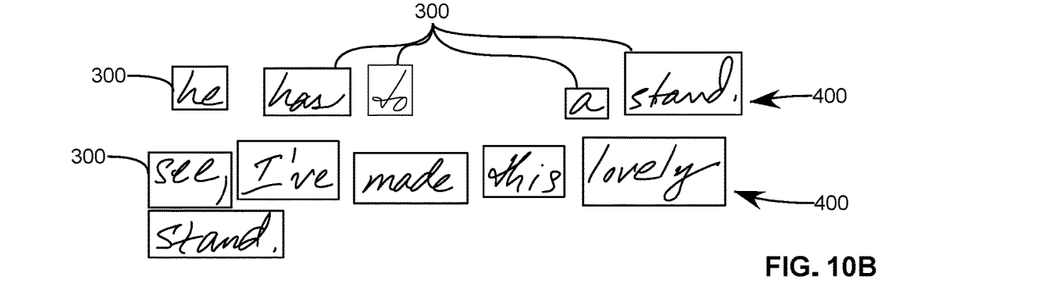
Figures 10C, 10D, 10E:
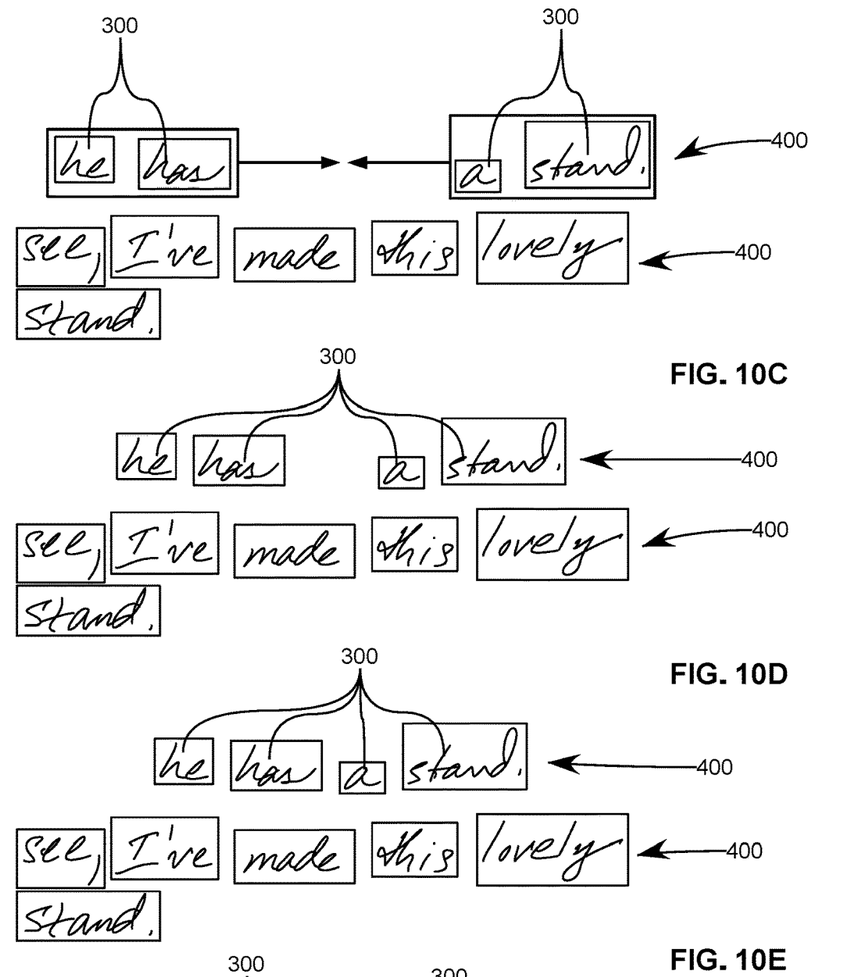
Figure 10F:
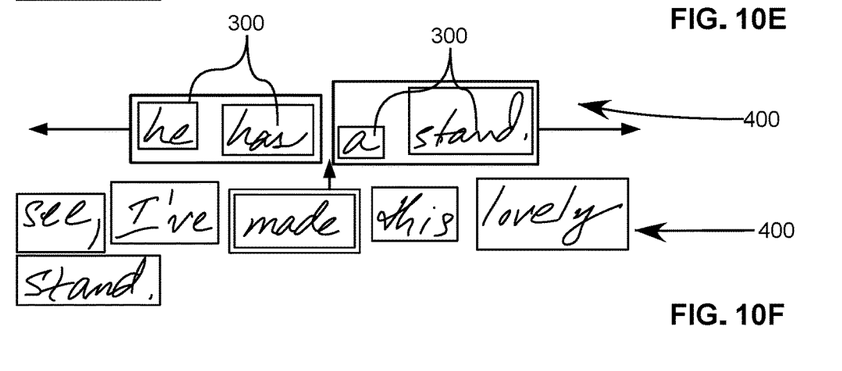
Figure 10G:
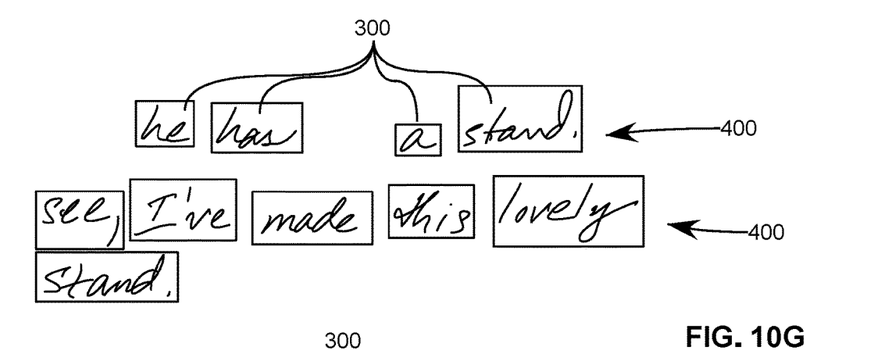
Figure 10H:
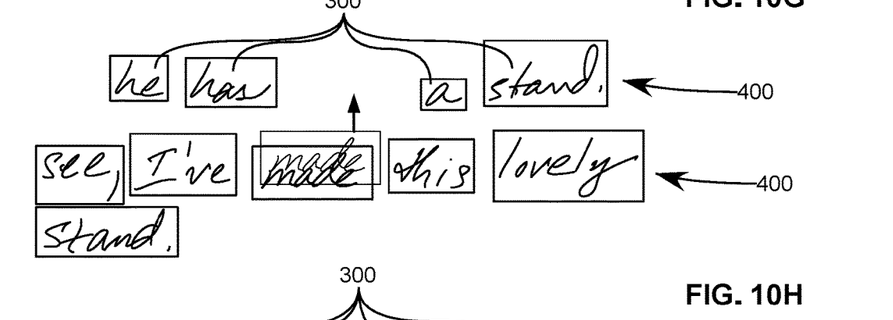
Figure 10I:
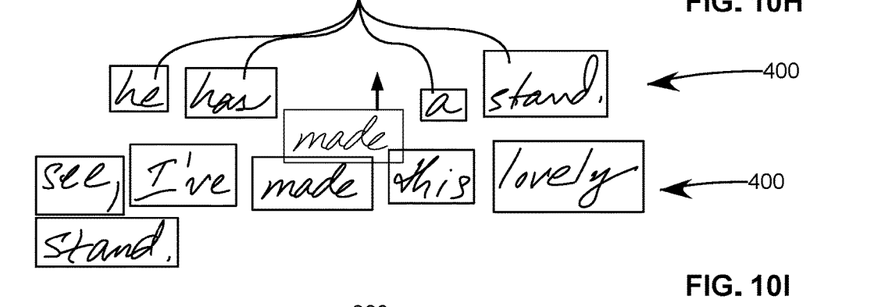
Figure 10J:
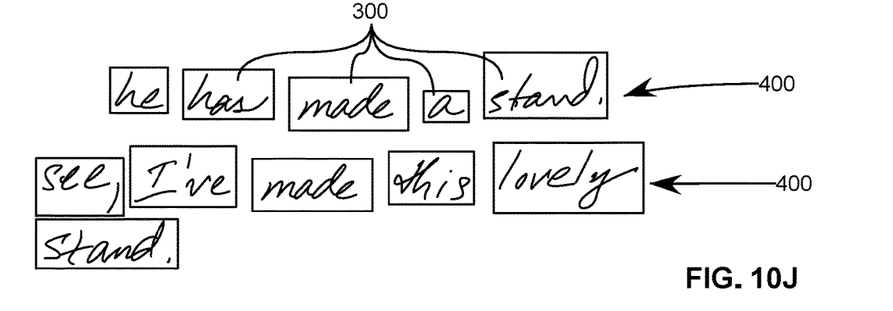

In edit word mode words can be selected and deselected; one way to do indicate word selection mode is to make the word boxes visible to the user as illustrated in FIG. 9B. From there, a predetermined user gesture can toggle selection of particular word boxes on and off, word by word and various modes and manipulation menus can be accessed so as to achieve the desired edit based on the input user gesture.

In this manner, the words in a document can be moved, such as via a drag operation to another position in the document. FIGS. 10A-J illustrate various operations which occur upon selection and a relocation of a particular word. It will be appreciated that upon insertion of a word onto a particular line, that the surrounding words can be configured to move or translate along the line so as to make room for the insertion. Additionally, in a drag operation, which is essentially a deletion of a word from a line, the words can be configured to translate into the previously occupied space so as to close up the space where the removed word used to be.

In some instances, the average spacing between adjacent words can be determined as the words of the line are recognized, this word spacing can be determined, and a relocation of the word can cause all the words on the line to automatically reposition in accordance with the determined word spacing such that the flow of the line appears natural with respect to the other lines or the previously detected spacing. This calculated spacing can be used for both insertion, as shown in FIGS. 10F-J, onto a line as well as for a word deletion, as illustrated in FIGS. 10A-E.

In some such embodiments, if there is insufficient room on the line to accommodate the insertion of a particular ward such that there is insufficient room on the line for each of the pre-existing words thereon, the end of the line can then be truncated and wrapped onto to the next line.

Figure 11A:
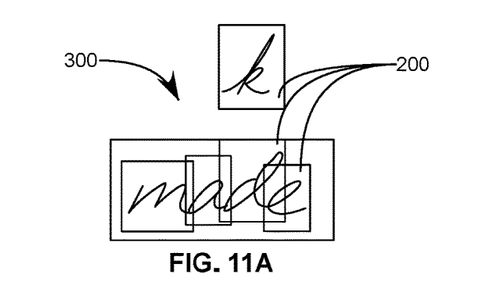
FIGS. 11A-H illustrate screenshot views of a selected character, and a movement transition illustrating an automatic re-spacing of surrounding characters in a word from which the character is being removed or deleted, additionally the movement transition is illustrated for inserting a character into the word wherein the characters are automatically spaced apart so as to accommodate the new character addition.
Figure 11B:
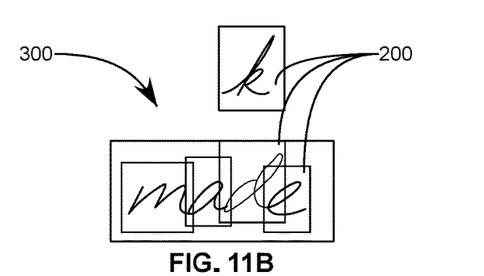
Figure 11C:
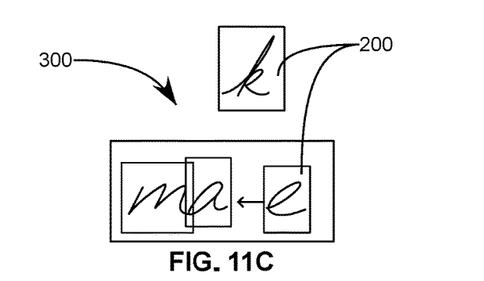
Figure 11D:
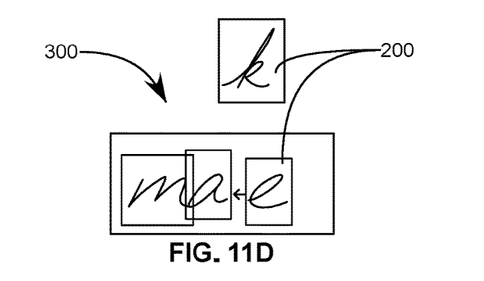
Figure 11E:
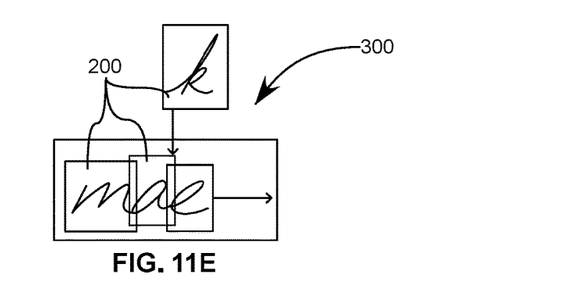
Figure 11F:
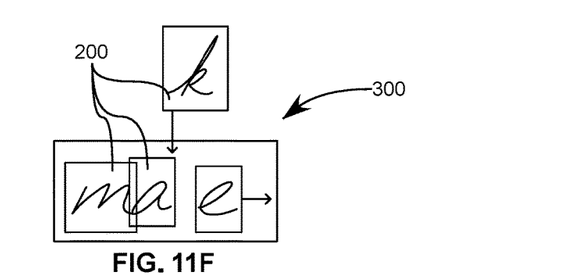
Figure 11G:
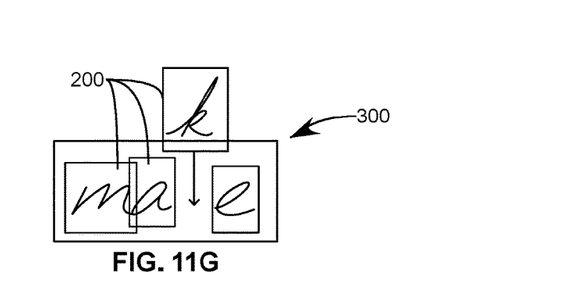
Figure 11H:
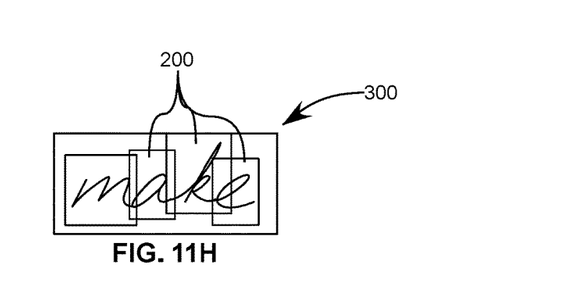

Similar mechanics can be utilized for the change, addition, or deletion of a character within a word, as illustrated in FIGS. 11A-H. Wherein a character spacing within a particular word is determined, and upon deletion, such as illustrated in FIGS. 11C-E, the characters are automatically repositioned to the natural spacing, or upon addition, such as illustrated in FIGS. 11F-H, wherein the adjacent characters are repositioned to allow for insertion of the character in a manner reflective of the determined natural spacing between characters.

Figure 12:
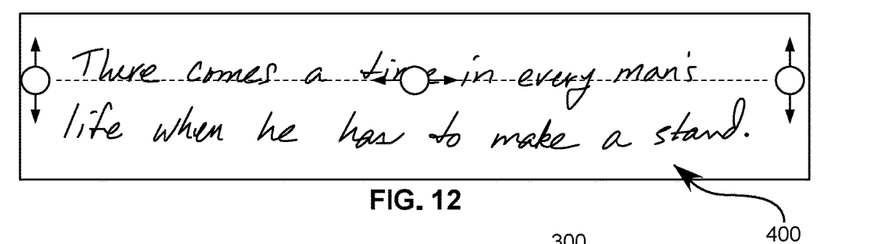
FIG. 12 illustrates a screenshot view of a line selection wherein an entire line may be selected and repositioned with regard to adjacent lines.
Figure 13A:
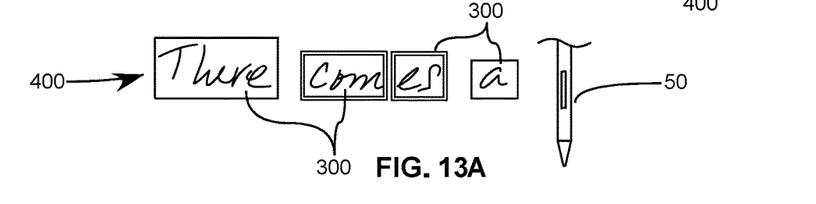
FIG. 13A-D illustrate screenshot views of various steps of a positive inference command sequence associating various previously unassociated strokes, characters or words.
Figure 13B:
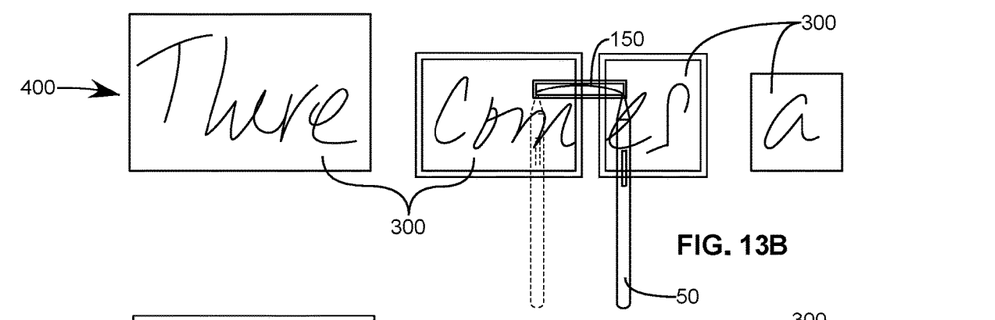
Figure 13C:
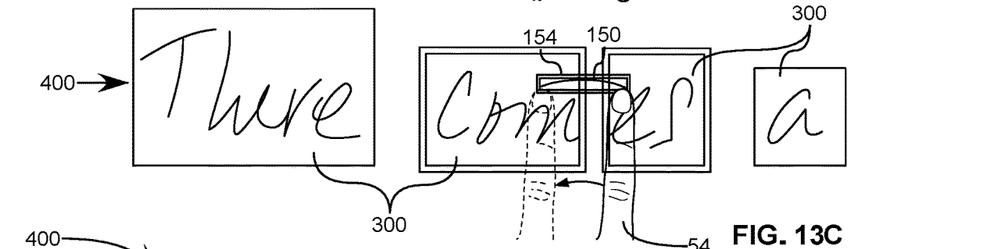
Figure 13D:
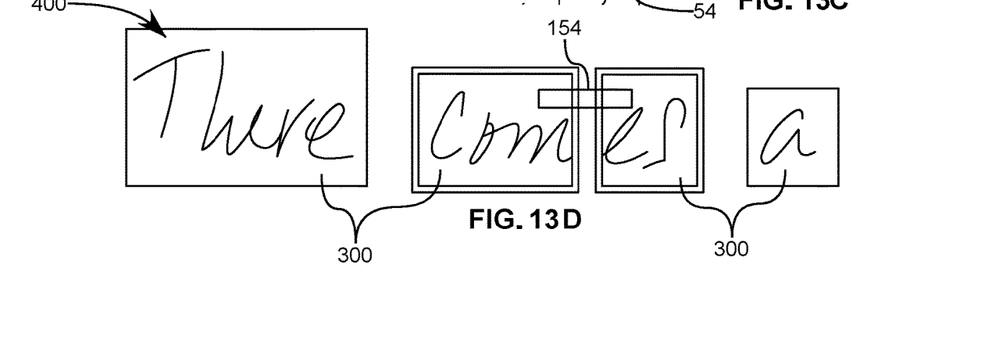

FIG. 12 also illustrates how a particular line 400 can be selected and repositioned with respect to adjacent lines so as to change the relative spacing of the entire line, so as to line up intended paragraphs, reduce the height of a paragraph so as to allow for insertion of another line, such as when running out of space on the bottom or edge of a page, etc.

In yet other aspects of the present invention, it has been recognized that variations in spacing often occur between strokes, characters, or words. Such an instance is illustrated in FIGS. 13A-D. Illustrated here is an instance in which the user has written various characters which are intended to be in a single word, but because of variation in the spacing, which can be caused due to numerous factors, such as hand repositioning while writing, or just through common mistake, the end characters are spaced from the previous characters by too wide a margin, and as such there is no overlap between the character boxes or the character margins and as such are not associated together.

It has then been recognized that a teaching sequence can be performed in which the user can provide what will be referred to herein as an inference stroke 150, spanning the gap between the unintentionally spaced characters. The inference stroke will then be recognized as a stroke connecting them, and can include a stroke margin 154 surrounding the inference mark, and a stroke margin as well. The inference stroke 150 can then be deleted, but the association between the characters retained, so as to retain the grouping of characters into a common word.

In some such instances, the processing circuitry 18 can be configured to differentiate between a plurality of input methods including at least a tactile touch input and input received by the writing utensil, such as the stylus 50, wherein input from the writing utensil is associated with a positive stroke, and touch input is associated with an alternative command. In other words, the inference stroke 150 can be provided using a stylus, however the deletion of the inference stroke 150, i.e. alternative command, can be achieved by providing a gesture using an alternative means, such as a finger swipe provided by the user's finger 54.

In some such embodiments, the alternative command can be an undo command regarding at least one previous stroke, wherein an inference stroke margin 154 of the inference stroke 150 can be retained, even if the stroke itself is deleted.

As such, the processing circuitry can be configured to receive from the writing utensil, a positive inference stroke connecting a plurality of separated strokes; and receive a touch input so as to delete the positive inference stroke, wherein the processing circuitry causes the non-transitory computer-readable media to retain inference information between the strokes so as to recognize the plurality of separated strokes as an associated character, word, or line. so as to achieve the desired result as discussed above.

This inference sequence, as discussed above, can be automatically detected, only active in edit mode, or the particular functions of this sequence can be toggled on or off in different editing modes, etc.

In some embodiments, this inference sequence can also be configured to automatically adjust the margin distances for strokes, characters, or words, depending on which types of groups are being connected by a particular inference stroke so as to allow for a degree of automatic learning and adaptation of the program to a particular user's natural stroke, character, or word spacing.

Additionally, sketches, or other quick hand-drawn sketches can also be configured to be incorporated into the system. It is beneficial to recognize that a sketch can be handled as a more complex letter which is simply made up of many more strokes. In some instances, a sketch recognition can merely be a different mode which is automatically entered as the processing circuitry recognizes a threshold value of associated or overlapping strokes. Sketches will also have an ultimate size that crosses multiple lines, whereas, normal letters of an alphabet fit inside the bounding box as expected. Sketches are therefore a special case that necessitates an alternative method of processing.

Figure 14:
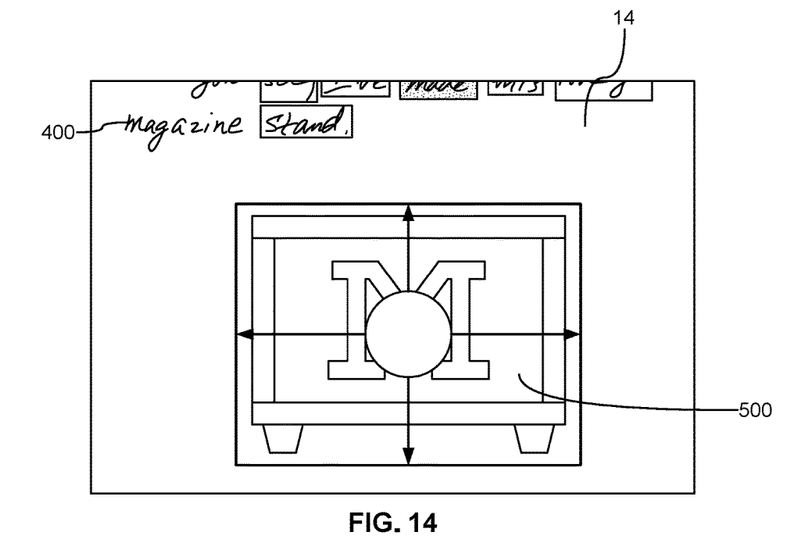
FIG. 14 illustrates a screenshot view of an object selection and relocation options of an object or character on the screen.

In certain embodiments, and as illustrated in FIG. 14, sketches 500 can be configured to be recognized as a floating graphic that can be moved around in an edit mode and the text would flow around the sketch. It will be understood that moving a sketch up in this case into existing text, that the text can be repositioned to allow for the insertion of the sketch.

It will then be appreciated that because in the system described above there is no pre-set character or language, and that the characters, letters, and lines are just a collection of one or more overlapping strokes. As such, one difficulty which arises is that there is always the chance that free-floating punctuation, accents, and/or grammatical marks which may either be too far from a word to be considered properly associated with word, or in some instances the punctuation can be intentionally unassociated with the work. In some such instances, the association between characters and punctuation can require a pre-determined size ratio between a particular stroke and a pre-existing character, i.e. a group of associated strokes, before an association is created and the stroke incorporated into the character. In order to override the ration requirement, an inference mark and deletion can be utilized to force an association. For example, a period at the end of a sentence is small with respect to the adjacent word, and no inference that the period is part of the word is desired. As such, a size ration threshold can be implemented which would exclude the inclusion of the period. Alternatively, dotting an "i" would also not be automatically associated with the below mark in such an instance, but an inference stroke could be created to connect the two strokes and subsequently deleted while maintaining the inference should the user subsequently desire to reposition the word or character.

Figure 16:
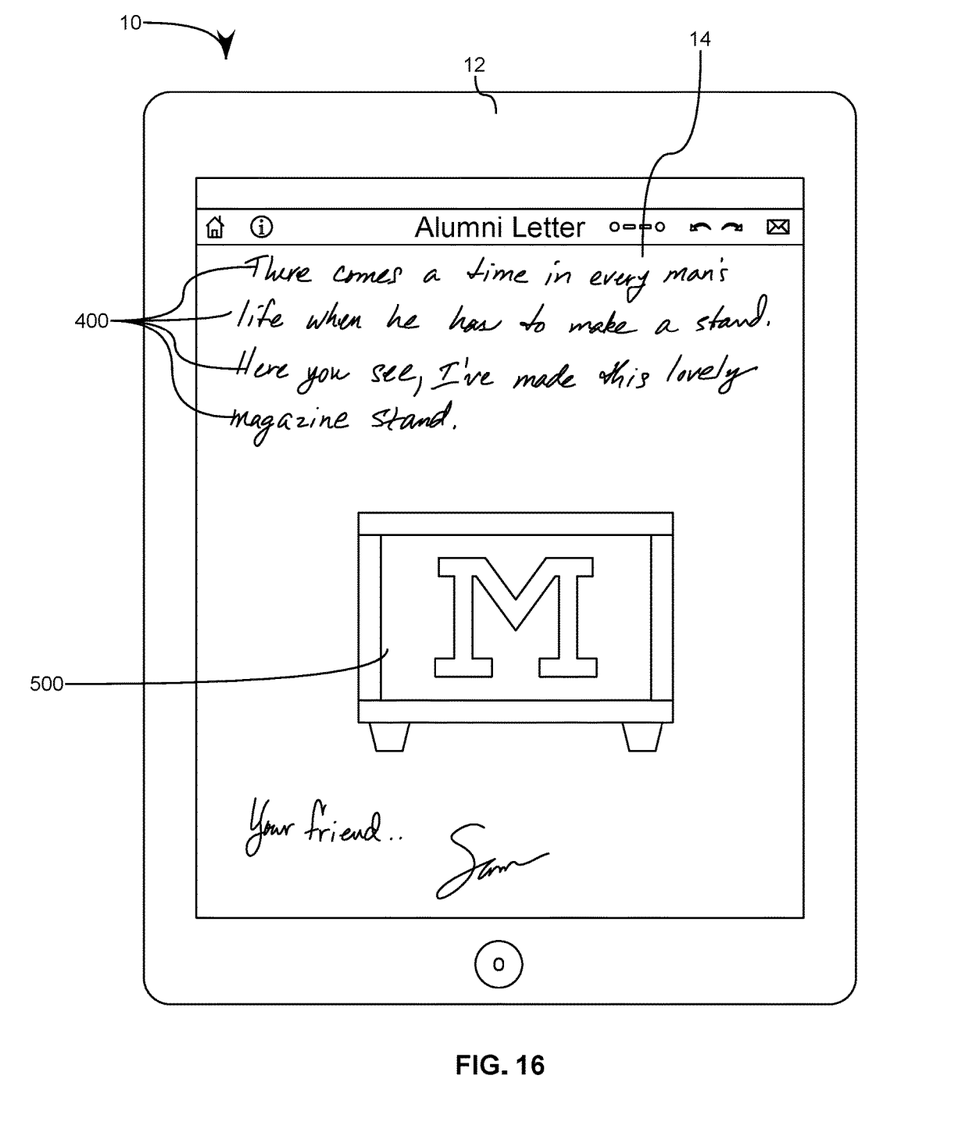
FIG. 16 illustrates a front view of an exemplary device having a final view of a handwritten note as displayed on a user interface of the device.

Shown below in FIG. 16 is an exemplary device 12 illustrating a screen shot of the writer screen on the user interface 14 based on the various embodiments and concepts discussed in this document. It will be appreciated that in some instances, or in particular modes, the user interface 14 can be configured to intentionally omit many typical complex interface options such as toolbars, formatting options, etc., as each of the commands are performed using distinct strokes and stylus behaviors.

Figure 15:
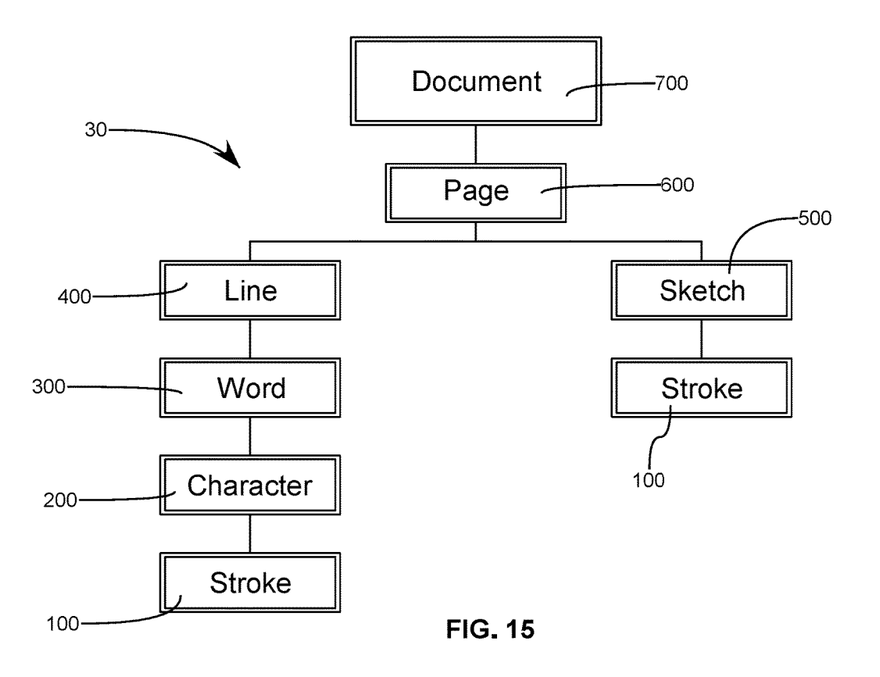
FIG. 15 illustrates a conceptual diagram of a stroke grouping hierarchy.

FIG. 15 illustrates a conceptual diagram of a stroke grouping hierarchy 30 which illustrates the segregation of strokes 100, characters 200, words 300, and lines 400, vs. strokes 100 which are ultimately recognized as sketches 500, which can then be incorporated onto overarching pages 600, and entire documents 700.

Additionally, in some embodiments, the input strokes can be translated into a computer Unicode character set so as to allow for the adaptation of the methods in the recognition of various language characters and writing formats, which allow for right-to-left and/or top to bottom written languages.

It will also be appreciated that since the characters themselves are not being translated into a particular code or font, but are rather treated as objects which are grouped together using a stroke proximity margin, that it will be exceedingly difficult to process these documents with optical recognition methods typically employed by standard computers. As such, when combined with cryptography, new written languages or codes can be created that would be theoretically unbreakable or otherwise increasingly secure.

In particular, there are simple encoding schemes that are extremely difficult to break without a specific key. The present invention has the advantage of not requiring cryptography, which is often required to secure things written in plain English as the strokes are a grouping of individual data points rather than recognized characters.

Figure 17:
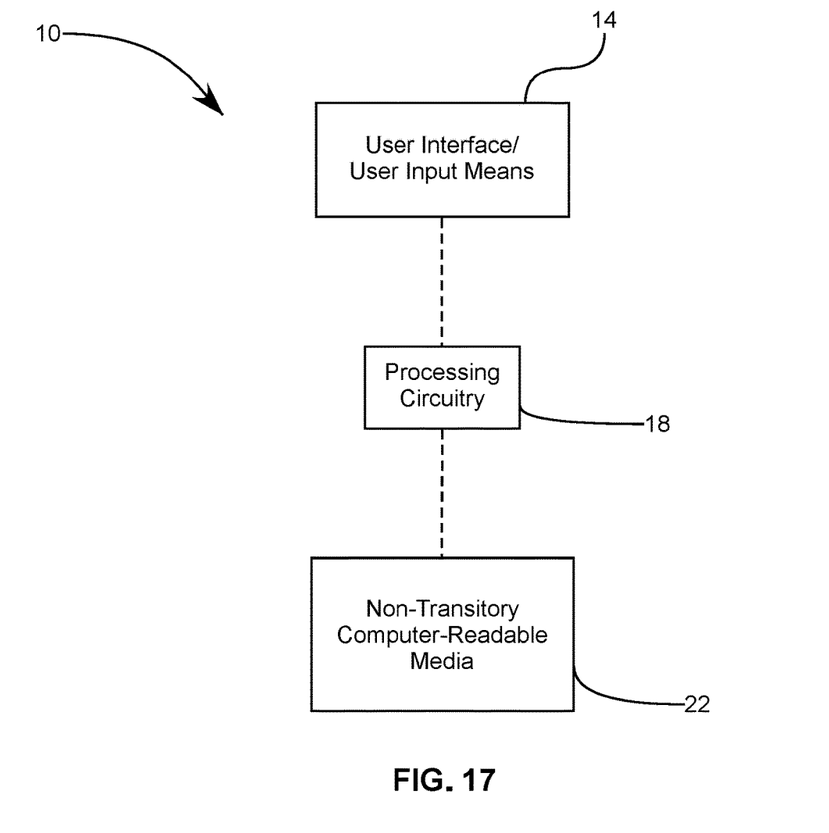
FIG. 17 illustrates an example schematic of a device or circuitry configured to store and perform the various steps and functions of the invention as contemplated herein.

FIG. 17 illustrates an example schematic of a device or circuitry 10 configured to store and perform the various steps and functions of the invention as contemplated herein. The device 10 can be equipped with a user interface 14 for receiving inputs, such as strokes, processing circuitry 18 can analyze those inputs, such as the strokes and determine various bounding boxes and relationships associated with the strokes as described above, and non-transitory computer readable media 22 can store information association with those inputs, as well as instructional information from which the processing circuitry can follow commands or rules to perform the various calculations and determinations discussed above.

Various embodiments and options have been described herein that are exemplary of the present invention; one skilled in the art will recognize additional embodiments within the spirit and scope of the invention. Modification and variations can be made to the disclosed embodiments without departing from the scope of the disclosure. Those skilled in the art will appreciate that the applications of the embodiments disclosed herein are varied. Accordingly, additions and modifications can be made without departing from the principles of the disclosure. In this regard, it is intended that such changes would still fall within the scope of the disclosure. Therefore, this disclosure is not limited to the particular embodiment as shown, but is intended to cover modifications within the spirit and scope of the disclosure.

What is claimed is:

1. A method of recognizing and processing hand-written strokes and characters, the method comprising:
    receiving a plurality of strokes provided by using a writing utensil on an input recognition interface;
    recognizing the plurality of strokes provided on the input recognition interface utilizing processing circuitry;
    differentiating between a plurality of input methods including at least a tactile touch input and input received by the writing utensil;
    determining a stroke box around each stroke;
    providing a stroke margin around each of the stroke boxes;
    determining an overlap between the stroke margins for each stroke box;
    correlating any overlapping stroke margins to one or more characters;
    providing a character box around each of the one or more characters;
    providing a character margin around each of the one or more character boxes;
    determining overlap between the character margins for each character box;
    correlating overlapping character margins to one or more words; and
    storing stroke and character information on a non-transitory computer-readable medium;
    providing a word box around each of the one or more words;
    providing a word margin around each of the one or more word boxes;
    determining an overlap between the word margins for each word box;
    correlating overlapping word margins to one or more lines;
    determining a line box correlating to the vertical and horizontal bounds of each line;
    determining a reference line for each line box;
    determining an offset of each word with respect to the reference line;
    calculating an average character spacing and average word spacing;
    selecting an individual character or word;
    repositioning the individual character word within an associated word or reference line;
    wherein one or more surrounding characters or words are configured to be automatically repositioned along the reference line to allow for repositioning of the individual character word in accordance with the average character or word spacing on the reference line having a proper associated offset with respect to the reference line;
    wherein input from the writing utensil is associated with a positive stroke, and touch input is associated with an alternative command; wherein at least one alternative command is an undo command regarding at least one previous stroke,
    receiving, from the writing utensil, a positive inference stroke connecting a plurality of separated strokes; and
    receiving a touch input so as to delete the positive inference stroke, wherein the processing circuitry causes the non-transitory computer-readable media to retain inference information between the strokes so as to recognize the separated strokes as an associated character, word, or line.

* * * * *